(12) United States Patent
Tanner

(10) Patent No.: US 6,217,004 B1
(45) Date of Patent: Apr. 17, 2001

(54) FLOW CONTROL ARRANGEMENT IN A CIRCULATION LUBRICATION SYSTEM

(75) Inventor: Timo Tanner, Jyväskylä (FI)

(73) Assignee: Safematic Oy, Muurame (FI)

( * ) Notice: Subject to any disclaimer, the term of this patent is extended or adjusted under 35 U.S.C. 154(b) by 0 days.

(21) Appl. No.: 09/341,868

(22) PCT Filed: Apr. 22, 1998

(86) PCT No.: PCT/FI98/00357

§ 371 Date: Jul. 20, 1999

§ 102(e) Date: Jul. 20, 1999

(87) PCT Pub. No.: WO98/48214

PCT Pub. Date: Oct. 29, 1998

(30) Foreign Application Priority Data

Apr. 23, 1997 (FI) .......... 971744

(51) Int. Cl.⁷ .......... F16K 5/08
(52) U.S. Cl. .......... 251/209; 251/248; 251/310; 251/294
(58) Field of Search .......... 251/209, 212, 251/248, 310, 294

(56) References Cited

U.S. PATENT DOCUMENTS

| | | | |
|---|---|---|---|
| 1,180,360 | * 4/1916 | Yeoman | 251/310 X |
| 1,378,405 | * 5/1921 | Farmer | 251/248 X |
| 1,381,598 | * 6/1921 | Stoll | 251/310 |
| 1,397,867 | * 11/1921 | Jones | 251/209 |
| 1,710,515 | * 4/1929 | Roman | 251/248 X |
| 3,208,719 | 9/1965 | Hulsey . | |
| 3,475,002 | * 10/1969 | Phillips | 251/209 X |
| 3,561,487 | * 2/1971 | Reed, Jr. | 251/310 X |
| 3,903,925 | 9/1975 | Perry . | |
| 4,022,426 | * 5/1977 | Read | 251/310 X |
| 4,102,357 | * 7/1978 | Charlton | 251/209 |
| 4,177,947 | * 12/1979 | Menzel | 251/209 X |
| 4,395,018 | * 7/1983 | Moen | 251/310 |
| 4,564,044 | * 1/1986 | Biller et al. | 251/310 X |
| 5,340,030 | * 8/1994 | Siegrist, Jr. | 137/625.31 X |

FOREIGN PATENT DOCUMENTS

| | | | |
|---|---|---|---|
| 173704 | 8/1905 | (DE) . | |
| 1 550 400 | 9/1969 | (DE) . | |
| 1166882 | * 11/1958 | (FR) | 251/209 |
| 424024 | * 2/1935 | (GB) | 251/209 |
| 1251962 | * 11/1971 | (GB) | 251/209 |
| 2 034 863 | 6/1980 | (GB) . | |

\* cited by examiner

Primary Examiner—Joseph A. Kaufman
Assistant Examiner—John Bastianelli
(74) Attorney, Agent, or Firm—Pillsbury Winthrop LLP Intellectual Property

(57) ABSTRACT

An arrangement in a circulation lubrication system, the arrangement including a control mechanism for controlling the flow of lubricating oil supplied to a part to be lubricated. The control mechanism includes two interfitting tubes with apertures in walls of both of the tubes. The apertures are arranged to provide a flow orifice for the lubricating oil, and the tubes are arranged to be rotatable around their common symmetry axis to the effect that an angular position of the tubes in relation to one another changes and the apertures in the tube walls shift in a circumferential direction of the tubes by their relation to one another, thereby a change in a size of the flow orifice is provided by the apertures. The rotating movements of the tubes are produced by different transmissions.

7 Claims, 3 Drawing Sheets

FLOW CONTROL ARRANGEMENT IN A CIRCULATION LUBRICATION SYSTEM

BACKGROUND OF THE INVENTION

1. Field of the Invention

The invention relates to an arrangement in a circulation lubrication system, and more specifically to an arrangement comprising control means for controlling, in a desired manner, the flow of lubricating oil supplied to a part to be lubricated.

2. Description of Related Art

The above-described circulation lubrication systems are quite well-known today in various fields of the industry. In circulation lubrication systems, the lubricating oil is pumped out of a lubricant tank, through pipe lines, to the parts to be lubricated, and returned by means of return pipe lines to the lubricant tank. In circulation lubrication system, the oil typically has a constant pressure, which is about 5 bar. The flow is passed to the parts to be lubricated by means of separate flow meters. The oil flow control in the flow meters is typically carried out by using a throttle control, in which the desired flow to the parts to be lubricated is achieved by changing the cross-sectional area of the flow. In a typical known solution, the cross-sectional area of the flow is changed by means of a mechanism operated with an adjusting screw to the effect that when the adjusting screw is turned outwards, the cross-sectional area of the flow becomes larger and the flow increases. When the adjusting screw is turned inwards, the cross-sectional area of the flow becomes smaller and the flow decreases.

One drawback of the prior art solution is, for instance, that the control acts on the flow very quickly. At their lowest, flow rates to be controlled are in the range of 0.02 l/min, and thus the accurate control is achieved only with great difficulty by using the throttle control that acts in the above-mentioned manner, unless the whole operating range of the control device is reduced, for instance, to a ratio of 1/100, permitting the control device to control, at the maximum, the flow of 2 liters per minute. This adjustment range is then to be controlled with approximately ten round turns of the adjusting screw. One more drawback is that, during the adjustment, the movement of the adjusting screw is directed outwards from the body of the meter or inwards to the body of the meter, depending on the control direction, which makes the motorization of the control difficult. The above solution further increases the total length of the control device, and a tool is always needed for carrying out an adjustment.

BRIEF SUMMARY OF THE INVENTION

The aim of the invention is to provide an arrangement by means of which the drawbacks of the prior art can be eliminated. This is achieved by means of an arrangement according to the invention. Wherein the control means comprises two interfitting tubes with apertures in the walls of both of the tubes, the apertures being arranged to provide a flow orifice for the lubricating oil, and the tubes being arranged to be rotatable around their common symmetry axis to the effect that the angular position of the tubes in relation to one another changes and the apertures in the tube walls shift in the circumferential direction of the tubes providing by means of their relation to one another a change in the size of the flow orifice provided by the apertures.

An advantage of the invention is mainly that it permits very accurate control. Moreover, the arrangement according to the invention rotates freely around, so it cannot be damaged by inappropriate twisting. Another advantage of the arrangement according to the invention is that it is simple, and hence its introduction and use are economical.

BRIEF DESCRIPTION OF THE DRAWINGS

In the following the invention will be described in greater detail by means of examples shown in the attached drawings, wherein FIG. 1 illustrates a prior art arrangement for controlling a lubricant flow in circulation lubrication. In FIG. 1, the reference numeral 1 indicates an oil supply pipe having a pressure of 5 bar. In FIG. 1, the reference numeral 2 indicates a measuring pipe. The lubricant flows from the supply pipe 1 to the measuring pipe 2 and therefrom to parts to be lubricated. In FIG. 1, an arrow indicates the flow path of the oil.

The volume of flow is determined by the cross-sectional area of the flow in point A. When an adjusting screw 3 is turned outwards, the cross-sectional area of the flow becomes larger and the flow increases. When the screw is turned inwards, the flow decreases. Locking of the flow control is carried out by means of a locking nut 4.

Figure 1:
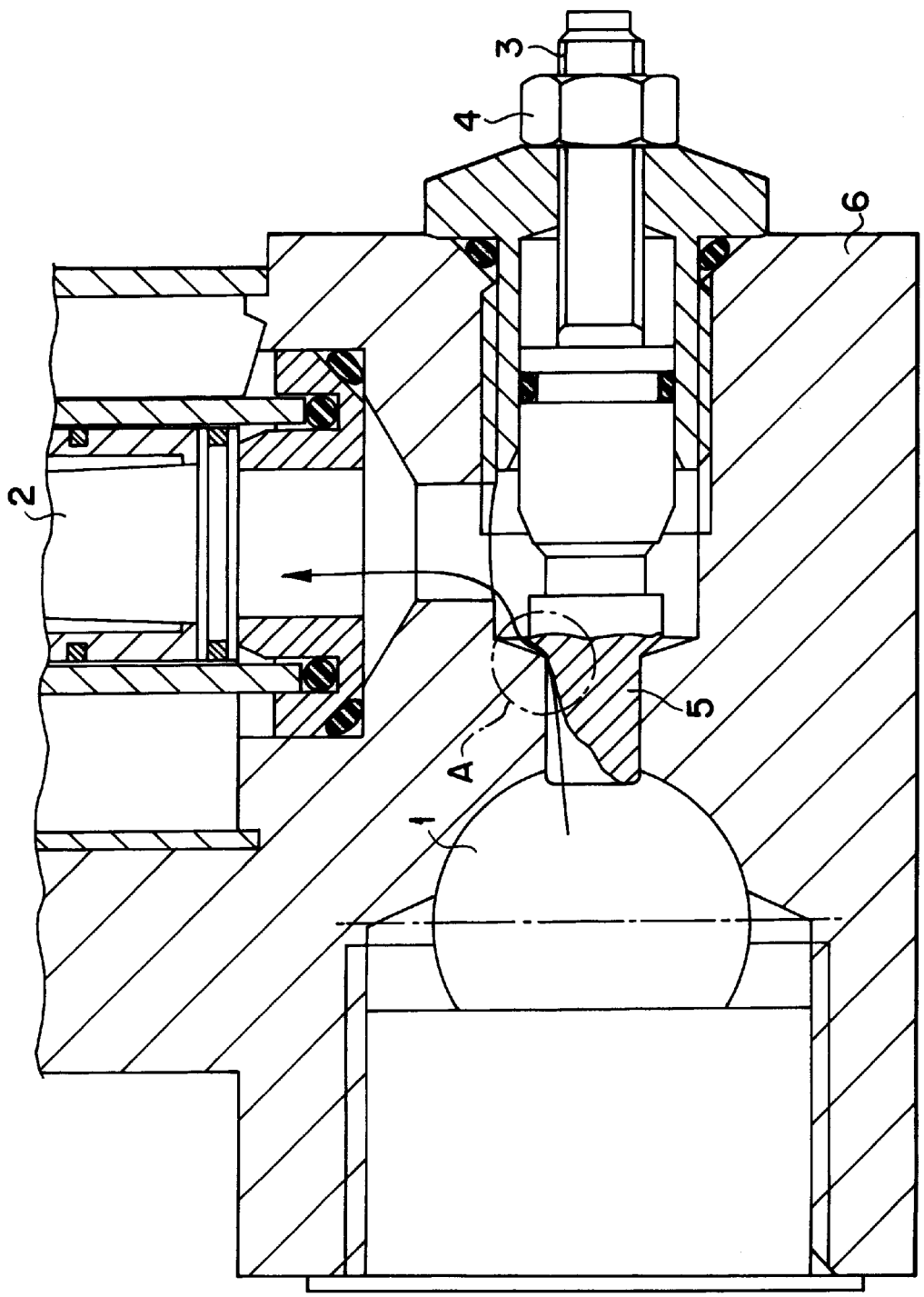
FIG. 1 is a schematic view of a prior art solution.

As stated above, one drawback is that the pitch of the thread in the adjusting screw 3 has a direct effect on the path of a throttling part 5, and as a consequence the control reacts very quickly. FIG. 1 also shows another drawback, i.e. the movement of the adjusting screw 3 is outwards from the body 6 of the meter or inwards to the body 6 of the meter, depending on the control direction, which increases the total length of the meter, for instance. Moreover, a tool is always needed for operating the adjusting screw 3 and the locking nut 4 as stated above.

A person skilled in the art will regard the structure and operation of the device described above as conventional technology, so they will not be discussed in greater detail herein.

Figure 2:
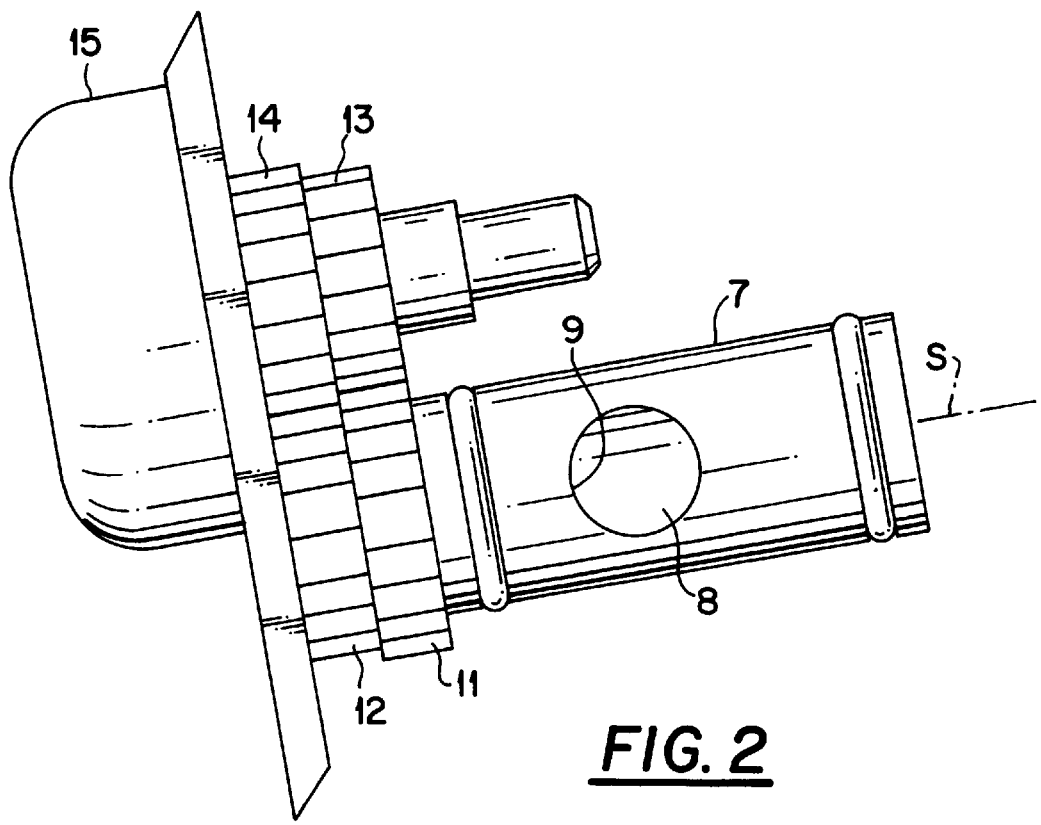
FIG. 2 is a schematic view of an arrangement according to the invention.
Figure 3:
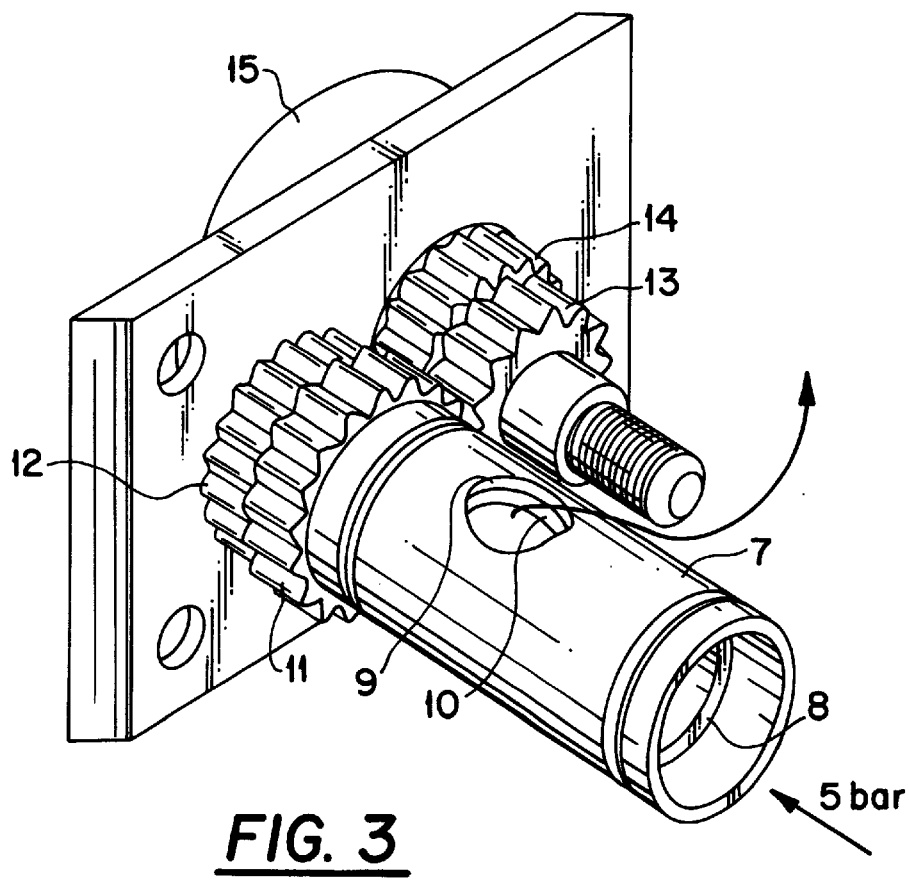
FIG. 3 is a schematic view of the arrangement in FIG. 2 seen from another direction.

FIGS. 2 and 3 illustrate one embodiment of the arrangement according to the invention.

DETAILED DESCRIPTION OF THE INVENTION

According to the basic idea of the invention, control means for the oil flow comprises two interfitting tubes 7 and 8 with apertures 9 and 10 in the walls of both of the tubes, the apertures being arranged to provide a flow orifice for the lubricating oil. The tubes 7 and 8 are arranged to be rotatable around their common symmetry axis S to the effect that the angular position of the tubes 7 and 8 in relation to one another changes and the apertures 9 and 10 in the tube walls shift in the circumferential direction of the tubes providing by means of their mutual relation a change in the size of the flow orifice provided by the apertures. The rotating movements of the tubes 7 and 8 are produced by means of different transmissions. In the example of FIGS. 2 and 3, different transmissions are produced by means of various gears 11 and 12 arranged in the tubes 7 and 8, the gears being rotated by means of a pair of gears 13 and 14 with equal toothing, arranged beside the tubes 7 and 8 at the parallel axis with the tubes. The pair of gears 13 and 14 is rotated by means of an adjusting wheel 15.

In principle, the flow control is carried out in the following manner using the arrangement in accordance with the invention. The pair of gears 13 and 14 with equal toothing is rotated by means of the hand wheel 15. The pair of gears 13 and 14 in question rotates for its part the inner tube 8 and the outer tube 7 with the gears 12 and 11. The gears 11 and 12 are provided with a different number of teeth, and consequently the transmission ratios of 14 to 12 and 13 to 11 are different. Hence a phase displacement is achieved between the tubes 7 and 8 by turning the adjusting wheel 15, and the apertures 9 and 10 in the tube walls shift in relation to one another. In FIG. 2, the control is closed, so the apertures 9 and 10 in the walls of both the inner tube 8 and the outer tube 7 do not overlap even partially. In FIG. 3, the control is completely open, so the apertures 9 and 10 in the walls of both the inner tube 8 and the outer tube 7 overlap, allowing the maximum oil flow through the control device. In FIG. 3, the pressure value of the oil supplied to the control device is indicated in the same manner as in FIG. 1, and the arrow indicates the flow path of the oil from the inside of the inner tube, through the flow orifice formed by the apertures 9 and 10, to the metering pipe and further to the part to be lubricated. For clarity, FIG. 3 does not show the supply pipe, nor the metering pipe.

With the above-described principle, the adjusting wheel 15 will reach a practically infinite accuracy of control if the number of teeth of the gears 11 and 12 is set proportionally as close to each other as possible. This will allow a very accurate control, since the available number of round turns for adjustment is 50, for example, instead of conventional ten round turns. Consequently, for instance, the control within the range of 0.02 to 15 liters per minute will be possible, thanks to the wide control range available. The flow orifices, shown as round openings in the figures, can readily be shaped in such a manner that with the same move of the adjusting wheel 15 the proportional change in flow is the same for all flow rates.

FIGS. 2 and 3 also show readily that the control device rotates freely around, so it cannot be damaged by inappropriate twisting. FIG. 1, for its part, shows that in the prior art structure, when the adjusting screw is turned open, the screw either falls out or the movement stops mechanically before the adjusting screw falls out. In this case, there is a danger that the structure will be damaged due to excessive turning.

Figure 4:
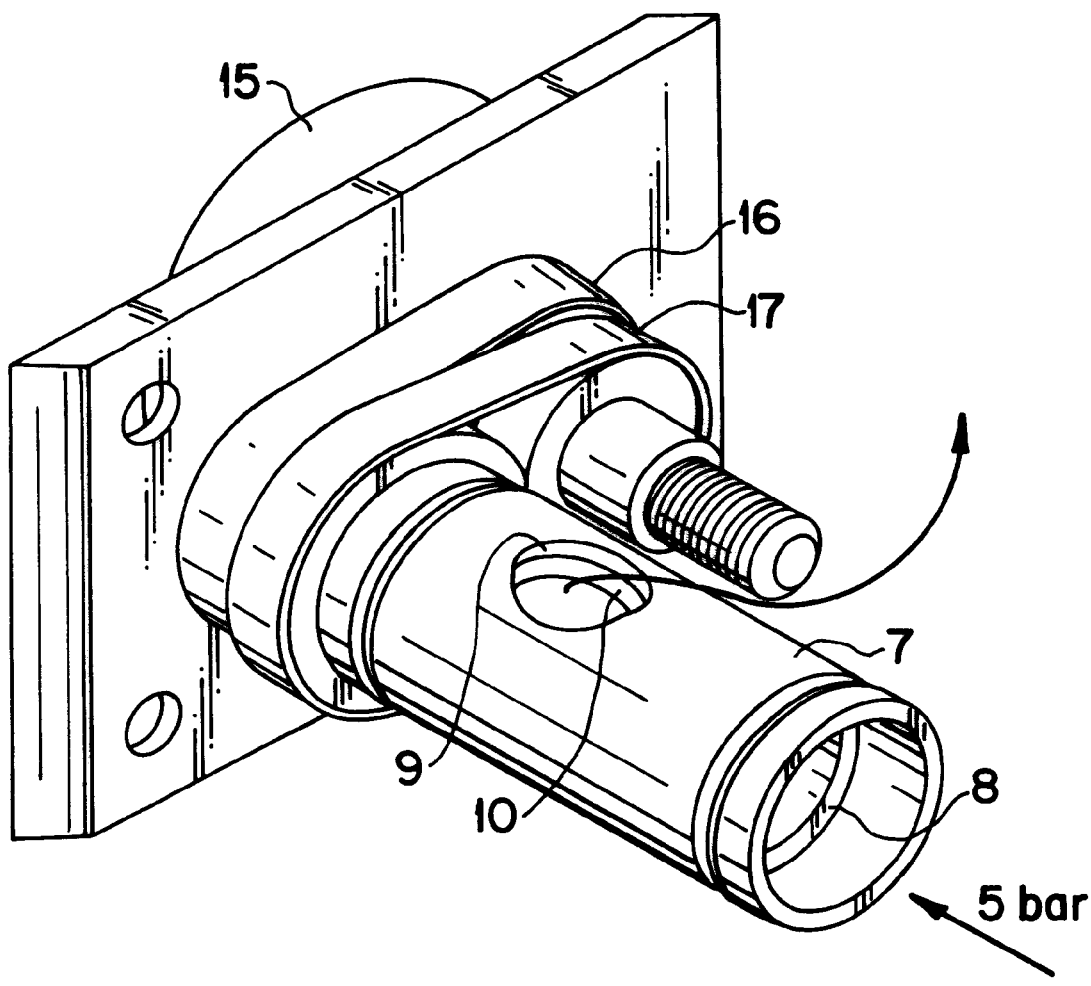
FIG. 4 is a schematic view of another embodiment of the arrangement of the invention

FIGS. 2 and 3 further show that in the arrangement according to the invention, the oil pressure inside the tube 8 expands the tube made of an elastic material providing an advantageous sealing effect on the structure. FIG. 4 shows another embodiment of the invention using transmission belts 16 and 17 instead of gears 11–14 as shown in the embodiment of FIG. 3.

The above-described embodiments are by no means intended to restrict the invention, but the invention can be modified quite freely within the scope of the claims. Accordingly, it is obvious that the arrangement according to the invention or its details need not necessarily be similar to those shown in the figures but other solutions are possible as well. The change in the angular position of the tubes produced by the control can also be brought about by other mechanisms than the gears presented in the figures. For instance, various belt transmissions can be mentioned as examples of alternative solutions.

What is claimed is:

1. An arrangement in a circulation lubrication system, comprising:
   control means for controlling the flow of lubricating oil supplied to a part to be lubricated,
   wherein the control means comprises two interfitting tubes with apertures in walls of both of the tubes, the apertures being arranged to provide a flow orifice for the lubricating oil, and the tubes being arranged to be rotatable around their common symmetry axis to the effect that an angular position of the tubes in relation to one another changes and the apertures in the tube walls shift in a circumferential direction of the tubes providing by means of their relation to one another a change in a size of the flow orifice provided by the apertures, and
   wherein rotating movements of the tubes are produced by means of different transmissions.

2. An arrangement as claimed in claim 1, wherein the different transmissions are produced by means of various gears (12, 11) arranged in the tubes (7, 8).

3. An arrangement as claimed in claim 2, wherein a gears (11, 12) arranged in the tubes are arranged to operate in conjunction with a pair of gears (13, 14) with equal toothing arranged beside the tubes at the parallel axis with the tubes.

4. An arrangement as claimed in claim 3, wherein the pair of gears (13, 14) with equal toothing is arranged to be rotated by means of an adjusting wheel (15).

5. An arrangement as claimed in claim 1, wherein different transmissions are produced by means of various belt transmission connected to the tubes (7, 8).

6. An arrangement in a circulation lubrication system, comprising:
   a control mechanism to control the flow of lubricating oil supplied to a part to be lubricated,
   wherein the control mechanism comprises two interfitting tubes with apertures in walls of both of the tubes, the apertures being arranged to provide a flow orifice for the lubricating oil, and the tubes being arranged to be rotatable around their common symmetry axis to the effect that an angular position of the tubes in relation to one another changes and the apertures in the tube walls shift in a circumferential direction of the tubes in relation to one another so as to change a size of the flow orifice provided by the apertures, and
   wherein rotating movements of the tubes are produced by rotating gears.

7. An arrangement in a circulation lubrication system, comprising:
   a control mechanism to control the flow of lubricating oil supplied to a part to be lubricated,
   wherein the control mechanism comprises two interfitting tubes with apertures in walls of both of the tubes, the apertures being arranged to provide a flow orifice for the lubricating oil, and the tubes being arranged to be rotatable around their common symmetry axis to the effect that an angular position of the tubes in relation to one another changes and the apertures in the tube walls shift in a circumferential direction of the tubes in relation to one another so as to change a size of the flow orifice provided by the apertures, and
   wherein rotating movements of the tubes are produced by transmission belts.

\* \* \* \* \*